UNITED STATES PATENT OFFICE.

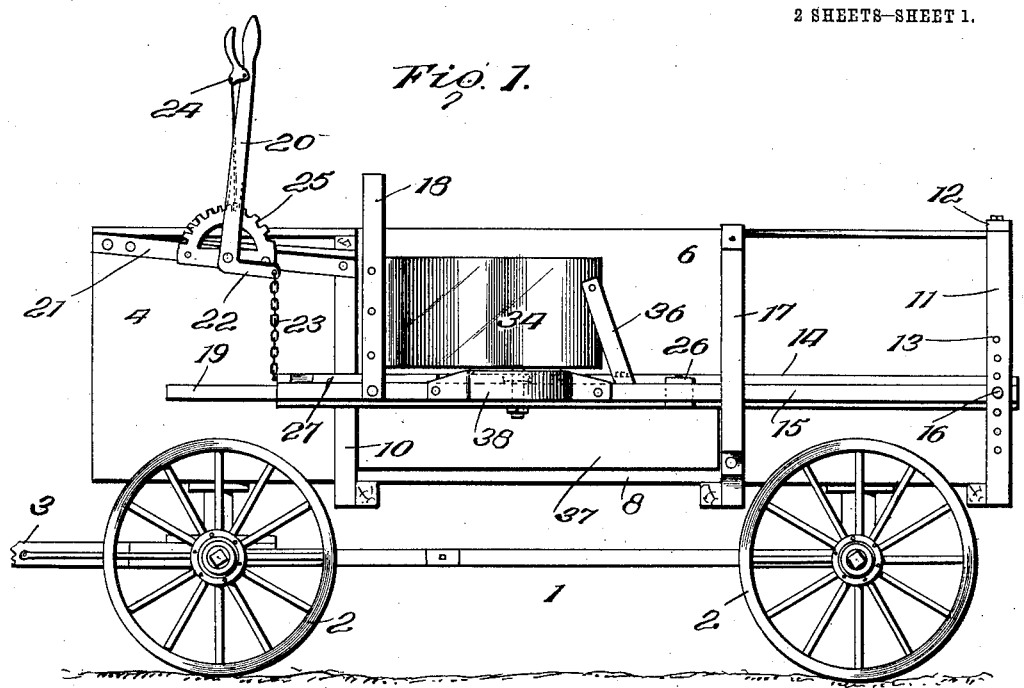
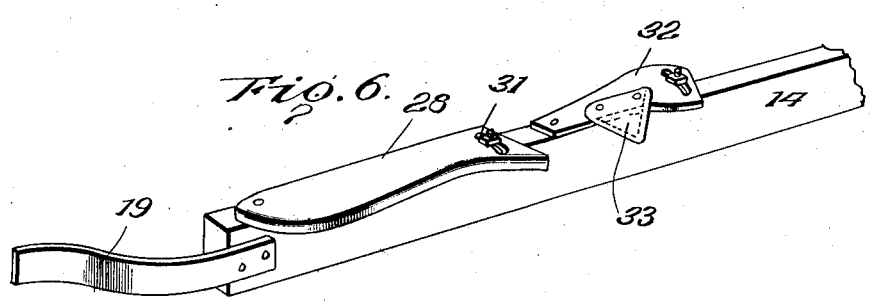
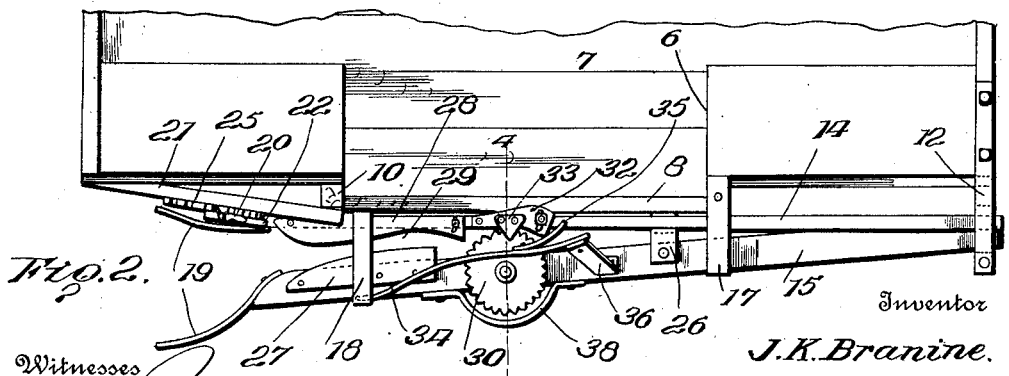

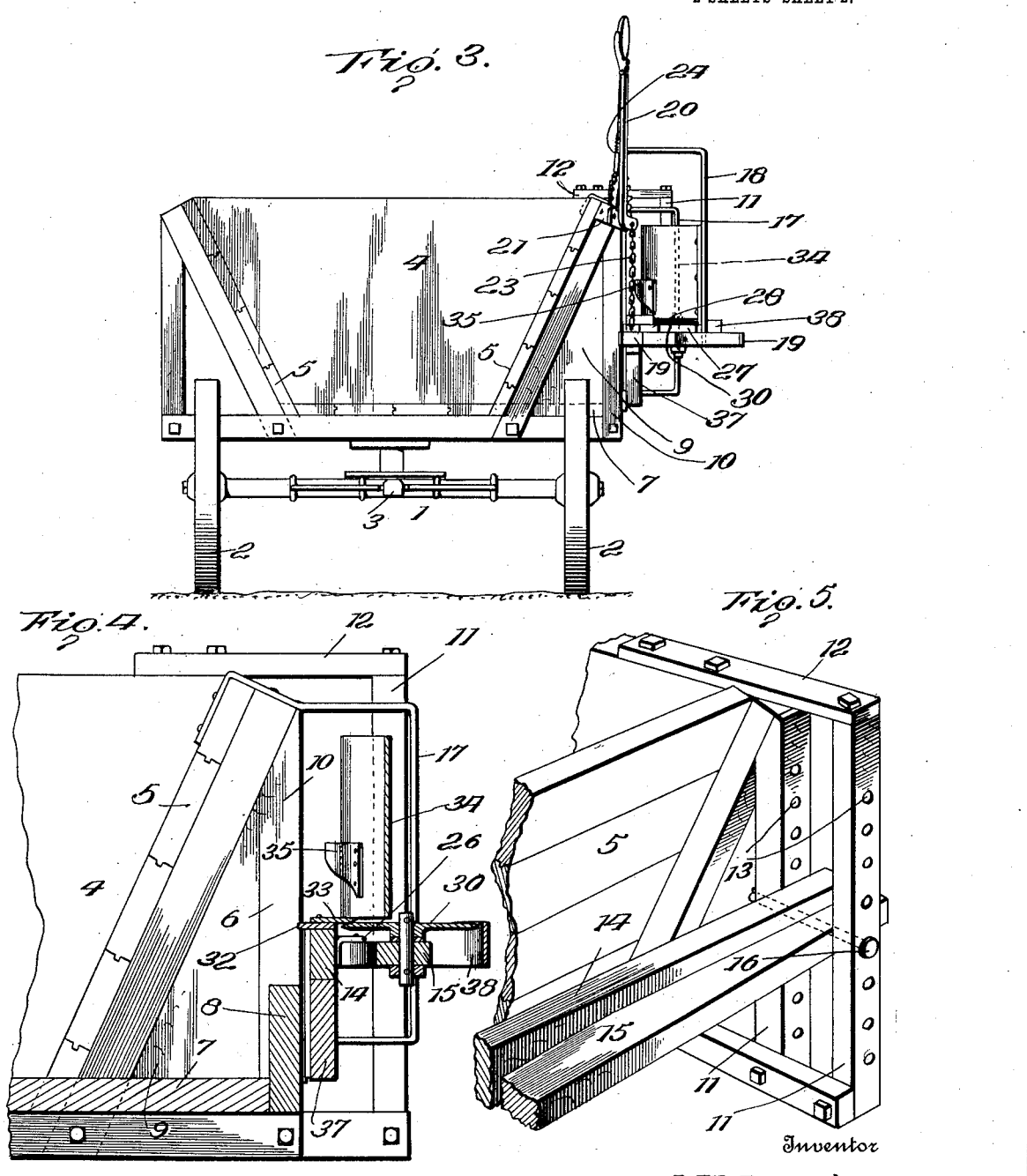

JOHN K. BRANINE, OF UDALL, KANSAS.

CORN-HARVESTER.

1,100,211.  Specification of Letters Patent.  Patented June 16, 1914.

Application filed December 28, 1912. Serial No. 739,116.

*To all whom it may concern:*

Be it known that I, JOHN K. BRANINE, a citizen of the United States, residing at Udall, in the county of Cowley and State of Kansas, have invented certain new and useful Improvements in Corn-Harvesters, of which the following is a specification.

This invention relates to corn harvesters, and has special reference to machines for cutting off the tops of Kafir corn or similar plants.

The object of the invention is to provide a machine which may be easily drawn over a field at the side of a row of standing plants and is equipped with means at one side for engaging the plants and severing the tops of the same.

The invention also has for its object the provision of novel means for directing the severed heads of the plants into the box of the vehicle upon which the cutting apparatus is mounted and to prevent the severed portions dropping to the ground.

A further object of the invention is to provide means of novel character whereby the plants will be directed positively to the knives or cutters, so that they will be directly engaged by the same as the machine is drawn along the row of plants, and the invention seeks to improve, generally, the construction and arrangement of parts of a corn harvester to the end that the durability and the efficiency of the same will be increased and an economy in manufacture effected.

The several stated objects of the invention, and such other objects as will incidentally appear as the description of the invention proceeds, are attained in apparatus of the character illustrated in the accompanying drawings, and the invention resides in certain novel features which will be particularly pointed out in the claims following the description.

In the drawings: Figure 1 is a side elevation of a corn harvester embodying my improvements; Fig. 2 is a plan view of the harvesting mechanism; Fig. 3 is an end elevation of the wagon and the harvesting mechanism; Fig. 4 is an enlarged transverse vertical section taken on the line 4—4 of Fig. 2. Fig. 5 is a detail perspective view of the rear support; Fig. 6 is a detail perspective of the adjustable guide and the adjustable cutter.

In carrying out my invention, I employ a truck 1 which may be of any convenient or preferred construction equipped with ground wheels 2 and a tongue or other draft device 3 whereby it may be drawn over the field. Upon this truck, I secure a box 4 which has upwardly diverging sides, as shown at 5, whereby the box may have a large capacity without extending very high above the truck and one side wall of the body is cut away at its center, as shown at 6, and the floor 7 is extended through said cut-away portion. At the outer edge of the said extension of the floor, I secure a rail or board 8 which will prevent the escape of the heads directed into the box over the said board, the space between the ends of the floor extension and the side wall of the box being closed by boards 9 or other convenient means, as will be readily understood.

The closing boards 9 and the side board 8 are secured to the edges of the floor extension 7 and also to posts 10 erected at the corners of the floor extension and secured at their upper ends to the sides of the box. At the rear end of the box on the same side as this floor extension, I provide uprights 11 which are connected by a beam or brace 12 extending over and secured upon the rear end wall of the box. These posts 11 are provided with vertical series of openings 13 and between the said posts are arranged the rear ends of the longitudinally extending diverging bars 14 and 15 which support the guiding and cutting mechanism, the said rear ends of these bars being supported by a pin 16 inserted through the same and some of the openings 13, so that the bars may be supported at any desired height. At the rear end of the opening 6 in the side of the box, I provide a brace or guide 17 which extends beyond the said bars 14 and 15 so as to hold the same to the box without interfering in any way with the vertical adjustment thereof. The bars project forwardly beyond the opening 6, and adjacent their front ends have secured thereto an arch 18 which projects upwardly therefrom above the wagon box so as to clear the heads of the plants and maintain the proper spaced relation of the front ends of the bars. Diverging forwardly extending deflectors or guides 19 are secured to the front extremities of these bars, and, as the apparatus is drawn along the row of plants, these deflectors will pass at opposite sides of the same so as to direct them into the space between the bars where they will be acted upon by the cutters. The vertical adjustment of these main supporting bars 14 and 15 accomplish through the medium of the pin 16 and the openings 13 is sufficient to bring them approximately to the proper level for severing the tops of the plants, and a further adjustment, by which the knives will be brought into the exact position necessary to engage the stalks at the proper height, is effected by means of a lever 20 which is fulcrumed upon a beam 21 secured to the side of the wagon box and provided with a rearwardly extending arm 22 from which a chain 23 extends to the front end of the inner bar 14. The lever is provided with the usual holding device 24 engaging a segment 25 on the wagon box so that the front end of the bars may be brought into the proper position and held in the position in which they may be set. To further maintain the proper spaced relation of the bars 14 and 15 a bracket 26 is secured to and extends between the same at an intermediate point of the length thereof, as shown most clearly in Fig. 2. Upon the upper sides of these main bars 14 and 15 are secured shoes or guides 27 and 28 which are preferably metallic plates having their edges projecting beyond the opposed faces of the bars and shaped to provide a space 29 through which the stalks must pass and by which they will be directed to the cutters, the rear portion of the shoe or plate 28 being turned outwardly and terminating adjacent the rotary cutter 30 which is mounted upon the outer supporting bar 15 and is provided with a serrated or toothed edge, as clearly shown. The rear end of the shoe or plate 28 is constructed with a slot 31 through which a fastening pin is inserted into the inner bar 14 so that the said shoe may be adjusted toward the cutter as its edge is worn away through contact with the plants. In rear of this shoe 28, I secure upon the upper side of the bar or beam 14 a plate 32 carrying a fixed plate or cutter 33 which is arranged to overlap the edge of the rotary cutter 30, as shown most clearly in Fig. 4, so that the stalks will be completely severed and choking of the apparatus will be avoided. Secured to and extending from the arch 18 over the rotary cutter 30 is a guiding shield 34 which extends toward the wagon box and in rear of the cutters is provided with an additional guiding plate 35 on its inner side, so that, as the tops of the plants are cut from the stalks, they will be deflected positively into the wagon box. The rear end of this guiding shield is connected by a brace 36 with the outer supporting bar 15 so that it will withstand the pressure placed upon it by the plants. To further prevent the severed portions of the plants falling below the cutters onto the ground, a side board or guard 37 is secured to the under side of the beam 14 and depends therefrom adjacent the side board 8, as will be readily understood. A guard 38 is secured to the outer side of the beam 15 and extends around the outer edge of the rotary cutter so that persons standing or moving adjacent the apparatus will not be injured.

It is thought the operation of the apparatus will be readily understood. The machine is drawn over the field at the side of a row of plants so that the deflectors 19 will pass on opposite sides of the plants, as stated, and as the travel of the machine continues the shoes 27 and 28 will be brought into engagement with the plants so that they will be directed positively toward the rotary cutter and the engagement of this cutter with the plants will effect rotation of the cutter and the said rotation in turn will feed the plants positively against the fixed cutter so that they will be completely severed. The shield or guide 34 moving past the upper portion of the plant will aid the rotary cutter in feeding the same to the fixed cutter and will cause the severed portions to drop over into the wagon box.

The arch 18 and the bracket 26 serve to maintain the supporting bars 14 and 15 in fixed relation and the bars are supported in proper position to engage the plants by the pin 16 at their rear ends and by the lever 20 and the chain 23 connected thereto at their front ends.

It will be noted more particularly upon reference to Fig. 3 that the sides of the box in my apparatus diverge upwardly so that they will extend over the wheels of the running gear. By this arrangement I am enabled to use a box of large capacity upon an ordinary wagon running gear or a gear of narrow gage, so that a large load of cut corn may be carried and the wagon driven close to the row of standing plants without any liability of the wheels knocking down or becoming entangled with the plants. As the space between the sides of the box and the front and rear edges of the floor extension thereof are closed, the cut corn cannot roll off the front or rear edges of said floor extension, and the side board 8 and the depending guard 37 effectually prevent the cut corn rolling over the outer side edge of the floor extension as the apparatus is drawn over the field. The cutters can, therefore, be set at any desired height without any liability of the corn escaping below the cutters or their supports.

What I claim is:—

1. An apparatus for the purpose set forth comprising a portable box having one side cut away between its ends, a pair of supporting bars mounted on the side of the box and extending longitudinally past said opening, coöperating cutters on the said bars adjacent said opening, a deflector rigidly secured upon the outer bar adjacent the forward end thereof, a deflector pivoted at its front end upon the inner supporting bar and provided at its rear end with a transverse arcuate slot, and a securing bolt inserted through said slot into said bar.

2. An apparatus for the purpose set forth comprising a running gear, a box carried by said gear having upwardly diverging sides and having one side cut away between its ends and having its floor extended laterally through said cut-away portion of its side, a pair of transversely spaced longitudinal supporting bars adjustably mounted on the side of the box, and cutters on said bars adjacent the floor extension.

3. An apparatus for the purpose set forth comprising a portable box having one of its sides cut away between its ends and having its floor extended through said cut-away portion, an upstanding side board at the outer edge of said floor extension, closures between the ends of the floor extension and the side of the box, transversely spaced longitudinal supporting bars adjustably mounted on the side of the box, and cutters upon said bars above and adjacent said side board.

4. An apparatus for the purpose set forth comprising a portable box having one side cut away between its ends and having its floor extended through said cut-away portion, a side board secured to and rising from the outer edge of said floor extension, closures between the sides of the box and the ends of said floor extension, transversely spaced longitudinal supporting bars mounted on the side of the box, cutters upon the said supporting bars above the said side board, and a guard secured to and depending from the inner supporting bar immediately adjacent said side board.

5. An apparatus for the purpose set forth comprising a portable box having an opening in one side, transversely spaced longitudinal supporting bars mounted on the side of the box, coöperating cutters mounted on said bars adjacent said opening, guides on the bars in advance of the cutters, and an upstanding guide on the outer bar extending inwardly and rearwardly toward the opening in the side of the box and over the cutters.

6. An apparatus for the purpose set forth comprising a portable box having an opening in one side, a pair of transversely spaced longitudinal supporting bars mounted on the side of the box, a rotary cutter mounted on the outer supporting bar, a blade adjustably supported upon the inner bar and overlapping the rotary cutter, and a guide erected upon the outer bar and extending rearwardly and inwardly toward the opening in the side of the box above the cutter.

7. An apparatus for the purpose set forth comprising a box having an opening in one side, transversely spaced longitudinal supporting bars mounted on said side, cutters upon the said bars adjacent said opening, a guide upon the outer bar above the cutter and extending toward the opening in rear of the cutters, and a supplemental deflector upon said guide adjacent the rear end thereof.

8. An apparatus for the purpose set forth comprising a box having an opening in one side, longitudinal supporting bars mounted on said side and extending past said opening, a pair of guides upon said bars at the front ends thereof, the guide on the inner bar being laterally adjustable at its rear end, and cutters upon the bars in rear of said guides, the cutter upon the inner bar overlapping the cutter on the outer bar and being adjustable to and from the same.

9. An apparatus for the purpose set forth comprising a box, a pair of supporting bars mounted longitudinally on the box, coöperating cutters on said bars, a deflector rigidly secured on the outer bar at the forward end thereof, a deflector pivoted at its front end upon the inner supporting bar and provided at its rear end with a transverse arcuate slot, and a securing device inserted through said slot into said bar.

10. An apparatus for the purpose set forth comprising a box, supporting bars mounted longitudinally on the box, deflectors carried on the front ends of said bars, a cutter mounted upon the outer bar, a plate pivoted at its front end upon the inner bar and transversely adjustable upon said bar at its rear end, and a cutter carried by said plate and overlapping the cutter carried by the outer bar.

11. An apparatus for the purpose set forth comprising a box having an opening in one side, longitudinal supporting bars mounted on said side of the box, deflectors carried by the said bars at the front ends thereof, a cutter mounted upon the outer of said bars immediately adjacent the opening in the side of the box, a plate pivoted at its front end upon the inner supporting bar and adjustably secured to said bar at its rear end, and a cutter carried by said plate and overlapping the cutter carried by the outer bar.

In testimony whereof I affix my signature in presence of two witnesses.

JOHN K. BRANINE. [L. S.]

Witnesses:
A. J. ADAMS,
MAUD SULLIVAN.